United States Patent [19]

Wolf et al.

[11] 3,797,567

[45] Mar. 19, 1974

[54] CONTINUOUS STERILIZING APPARATUS

[75] Inventors: Günter Wolf, Karlsruhe-Waldstadt; Wilfried Willing, Sinnersdorf, both of Germany

[73] Assignee: H. Strunck & Co. Maschinenfabrick, Cologne-Ehrenfeld, Germany

[22] Filed: Feb. 29, 1972

[21] Appl. No.: 230,363

[30] Foreign Application Priority Data
Mar. 15, 1971  Germany............................ 2112375

[52] U.S. Cl.................................. 165/120, 165/122
[51] Int. Cl............................................. F24h 3/02
[58] Field of Search ................ 165/86, 120, 65, 122

[56] References Cited
UNITED STATES PATENTS 2,466,769   4/1949   Herold et al......................... 165/120
3,267,585   8/1966   Futer .................................. 165/120

*Primary Examiner*—Charles Sukalo
*Attorney, Agent, or Firm*—Allison C. Collard

[57] ABSTRACT

An apparatus for sterilizing objects along a continuous transport means by using heat stations, and a plurality of cooling stations applying sterilized air to the objects, whereby the cooling stations are separated into more than one cooling zone in the direction of movement of the objects and each zone has an individual supply line for the cool air, whereby the cooling temperature is reduced from zone to zone in the direction of movement of the objects in order to eliminate thermal stresses from occurring in the material of the objects.

7 Claims, 1 Drawing Figure

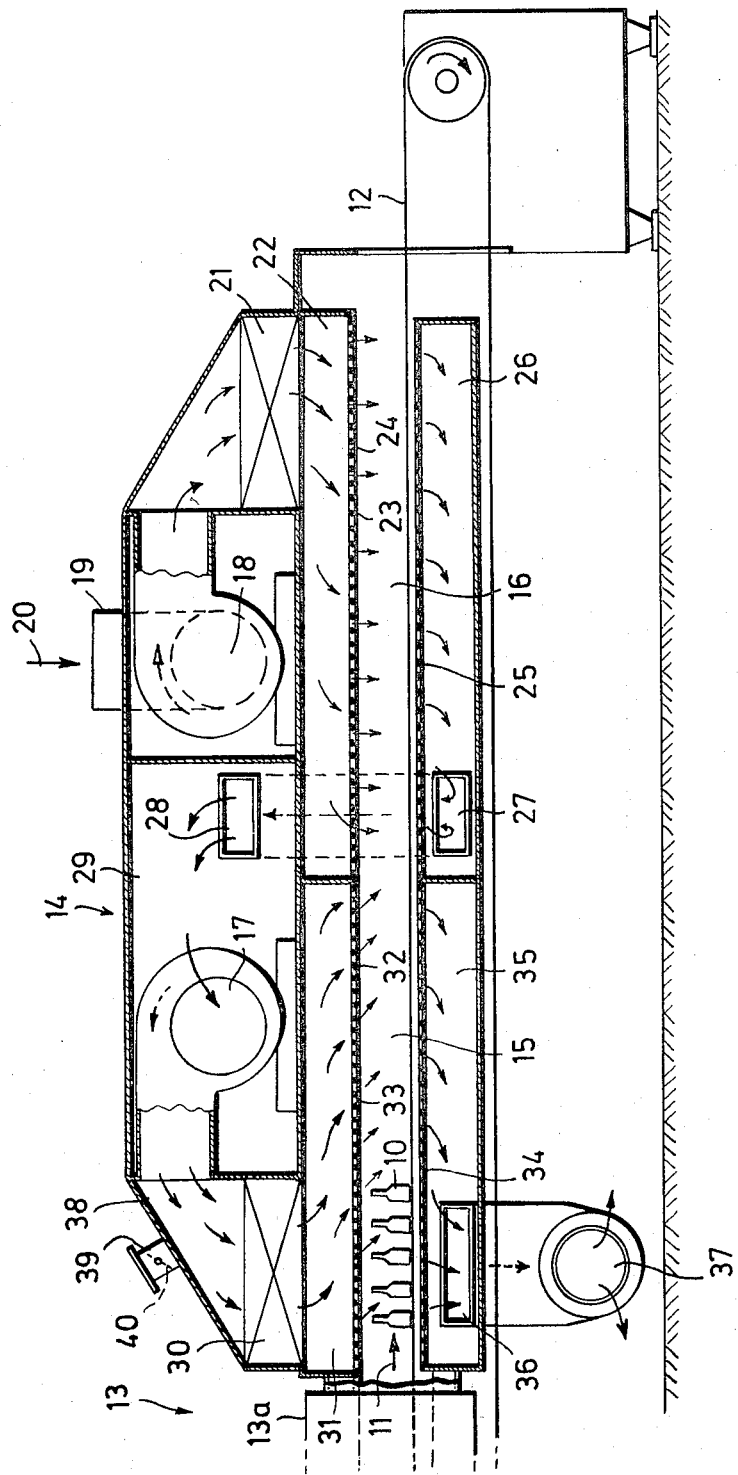

CONTINUOUS STERILIZING APPARATUS

This invention relates to an apparatus for sterilizing objects by the application of heat. The apparatus comprises a transport means for moving the objects to be sterilized. In the moving direction of the objects, a heating station and subsequent cooling station are provided in series with respect to each other. In the cooling station, the objects which were heated in the heating station are cooled by admitting sterilized air.

Conventional devices of this type, are usually constructed like a tunnel and provided with heating and cooling stations immediately adjacent to each other. This arrangement is disadvantageous because the objects to be sterilized have their highest temperature at the end of the heating cycle, just before entering the cooling station. In other words, the heated objects have their highest heated temperature when they are directly subjected to the cooling cycle. It is true that means or devices are provided between the heating and cooling station for thermal isolation, to allow for a limited divisional range between these two stations. These two stations can be isolated from each other, by providing an intermediary transition station. However, a transition station is usually very short so that no desirable cooling of the objects obtained between the heating station into the cooling station. Therefore, in conventional devices with a transition station, the objects enter the cooling station with a rather high temperature. It is obvious that this sudden change of temperature subjects the objects to be sterilized to a tremendous thermal strain. Depending on the objects, the change in surrounding atmosphere, from heating to cooling, may be in the range of a few hundred degrees C. The tension or strain which is set up in the objects, by these temperature changes, cause cracks or fissures on their surfaces, which may be very fine and not be detectable with normal human vision. These cracks or fissures may only be detectable if one looks especially for them. Furthermore, it is undesirable to provide an additional control or check for cracks, after sterilization, because of the possibility that the objects may be subjected to contamination. However, it may be technically feasible to check the sterilized objects for possible cracks or fissures, after the sterilization cycle has been completed. This, however, can hardly be done, because the objects in question are mainly containers in form of ampoules, or the like, which are filled with a media and subsequently closed. It is quite obvious that any flaws in the surface of the ampoules, or the like may be complicated or even made impossible, after they have been filled and closed. On the other hand, if any flaws should be detected in the surface of the objects after they are filled, the media would also have to be discarded, recycled with rather expensive methods.

Accordingly, the present invention provides a sterilizing apparatus of the above type wherein the stress or strain to which the objects are subjected when moving through the sterilizing cycle is substantially reduced. In the invention, the objects to be sterilized are subjected to a careful treatment which eliminates internal stress or strain, so that cracks or fissures in the surface can also be eliminated. The cooling cycle is separated into a plurality of cooling zones which are provided in series with each other in the moving direction of the objects. Each cooling zone is provided with an individual supply and removal system for the cool air. The temperature of the admitted cool air is thus reduced gradually from temperature zone to temperature zone. The objects are thus cooled in a stepwise operation so that the temperature difference between the separate zones can be so selected as to prevent damaging stresses.

In a preferred embodiment of the invention, it is advantageous to connect the outlet line for the cool air of one zone with the inlet line for the cool air of the preceeding temperature cooling zone. Therefore, the air which is being drawn off is introduced as the cooling air to the preceeding zone. In this manner, it is not necessary to have special means to bring the temperature of the cooling air adjacent to the heating station to a range which would be suitable for the purpose intended. Furthermore, the filters through which the cool air passes are not subjected to as much strain as when the cooled air is admitted separately into each zone.

There is only a small additional technical expense in order to implement the subject invention since it is normal to have two different cooling zones. The cooling cycle suggested in accordance with the subject invention does take longer than with conventional devices, since there is a lower temperature gradient between the cool air and the objects in the temperature zone, or zones adjacent the heating station. However, this rather minimal disadvantage of a longer cooling cycle is very minor when compared with the advantages, particularly when one considers that the majority of the containers are being filled with a pharmaceutical media.

The supply line for the cooling air in the last temperature zone may be connected with the atmosphere. This air would thus have to be filtered by suitable filter means, a usual procedure.

In another embodiment of the invention, additional filters are provided to the temperature zones in the direction of movement which precede the stream of air. This is particularly advantageous when the inlet lines for the cool air in the individual temperature zones precede the last temperature zone and are additionally connected with the atmosphere. In such an arrangement, adjusting means are provided for the atmosphere, so that the atmosphere can be adjusted depending on the corresponding environment.

In a further embodiment of the subject invention, the outlet line for the cooling air may be connected with the supply line for the cooling air by providing an intermediary cooling unit. In this way, the cooling air is guided in a closed circuit. The advantage of this closed circuit for the cooling air is that the filters are not subjected to very much wear and tear since little or no non-sterile fresh air is applied to the filters. Furthermore, the cooling units adjust the cooling temperature which is applied to the objects, the same cooling temperature at which the objects should leave the sterilizing apparatus. This is particularly advantageous when certain media have to be filled into these objects which have critical high temperature characteristics.

This invention further provides a compensation chamber preceding each cooling unit or cooling zone. The wall of the compensation chamber which is adjacent the cooling zone should be sieve-like. In this arrangement, an even air velocity can be obtained over the total zone. This arrangement can also be supported by providing a collecting chamber, following each cooling zone, so that the wall of the collection chamber adjacent the cooling zone has a sieve-like arrangement. In both cases, perforated sheet metal can be used for these walls, wherein the sievelike holes would have a diameter of only a few millimeters. It has been found that metal sheets having holes of 2 × .1mm are most suitable.

It is therefore an object according to the present invention to provide an apparatus for sterilizing objects by using heat and transport means whereby a plurality of cooling stations are provided adjacent to the heating station within the apparatus so that sterilized cool air can be applied in separated cooling zones along the direction of travel of the objects to be sterilized.

It is another object according to the present invention to provide a sterilizing apparatus for sterilizing objects moving along a transport means within the sterilizing unit, wherein following the heating station, cool air stations are provided having interconnected sterilized air zines.

It is still a further object according to the present invention to provide a sterilizing apparatus which is simple in design, easy to manufacture, and reliable in operation.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

The drawing shows a schematic embodiment of the subject invention.

Referring to the drawing, a schematic longitudinal cross sectional view is shown through the cooling chamber or station of a sterilizing tunnel. In the FIGURE, the objects 10 to be sterilized are transported through tunnel 13 by a conveyor belt 12 in the direction of the arrow. As already indicated, the schematic drawing shows only a cooling station 14. In front of cooling station 14 is a heating station 13a which is not shown in the drawing. Objects 11 are moved from heating station 13a into cooling station 14. The cooling station is separated into two zones 15 and 16. Blowers 17 and 18 are provided for the zones. The supply line 19 of blower 18 is connected to the atmosphere. The air enters the supply line in the direction of arrow 20, and into blower 18. The air then passes through filter 21. The filter serves to remove germs from the air stream so that the air becomes sterile. Adjacent to filter 21 is a balancing chamber 22. The lower part of balancing chamber 22 is provided with a perforated bottom plate 23. This bottom plate 23 runs parallel with respect to conveyor 12 and is disposed a short distance above the conveyor. In the region of zone 16, apertures 24 of bottom plate 23 run vertically, to have a laminar flow effect, to flow through zone 16 vertically from above. With this arrangement, it is to be understood that the conveyor belt 12 consists of a metal web, or any air permeable material.

Underneath conveyor belt 12, a further sieve-like bottom plate 25 is provided which forms the upper portion of a collection chamber 26 for the air which flows from above. This collection chamber 26 collects the air which flows from zone 16. The chamber 26 is connected with a channel 27 at the end which is adjacent to zone 15. The other end 28 of channel 27 runs into a chamber 29 into which the input opening of blower 17 is disposed. Blower 17 is associated with zone 15 of the system. The air moved through blower 17 first passes through a filter 30 and to a further balancing chamber 31 which is provided above zone 15. Balancing chamber 31 also has lower part with a bottom plate 33 having apertures 32. Apertures 32 are arranged obliquely with respect to each other so that the air which streams through bottom plate 33 into zone 15 moves in an acute angle with respect to vertically moving air. A further apertured bottom plate 34 is mounted underneath conveyor belt 12. Plate 34 forms the upper limitation of a collection chamber 35. The air exits through a channel 36, connected to a suction blower 37, and is moved to the outside of the system. Channel 38 which is mounted between blower 17 and filter 30, is provided with a jacket 39.

An adjustable locking, or throttle valve 40 is provided in jacket 39. With jacket 39, additional fresh air can be admitted to the air stream for zone 15, depending on the position of throttle valve 40. It is also possible to guide a portion of the air which comes from blower 17 to the outside of the system by means of jacket 39.

Objects 10, which come out of heating station 13a at a rather high temperature first move into zone 15. The cold air which is admitted to zone 15 has a temperature range which is noticeably above the temperature of the surrounding environment, since this air has already moved through zone 16. In other words, objects 10 are first cooled down to an intermediary temperature in zone 15 as a result of the cooling temperature prevailing in this zone. As conveyor belt 12 moves from zone 15 into zone 16, objects 10 gradually enter the lower temperature cooler air which corresponds to the environmental temperature of the atmosphere. This air is substantially lower, normally by a few 100° C, than the air which prevailed in heating device 13a. However, in view of the intermediary cooling of objects 10 in cooling zone 15, the temperature gradient between the objects and the air in zone 16 is no longer very great. The objects are thus not subjected to any surface stresses, and no cracks or fissures will occur.

In the embodiment of the drawing, different air streams are shown for zones 15 and 16. However, it is also possible to have the same type of air stream in both zones. It is also possible to have the same type of laminar flow in both zones, or to have an acute air stream with respect to the vertical air flow. It is very important that the turbulence of the air stream not become too excessive. The low turbulence will prevent extraneous particles which may have developed, for example, through friction, from entering the air stream, and the open containers being sterilized.

While only a single embodiment of the present invention has been shown and described, it will be obvious tnat many changes and modifications may be made thereunto without departing from the spirit and scope of the invention.

What is claimed is:

1. An apparatus for sterilizing objects after moving the objects on a transport means through a heated path and subsequently cooling the objects comprising:
   a first cooling station, surrounding the transport means,
   at least a second cooling station surrounding the transport means and coupled adjacent to said first cooling station in the direction of the moving objects, said stations having individual supply and exhaust ducts for the cool air, and cool air zones for receiving the objects on the transport means, the exhaust duct for the air of said second station being connected to the input air duct of said first station, so that said stations have a common circulatory system, the exhaust duct of said first station exiting externally from said cooling zones, so that the temperature is reduced in successive stations along the transporting direction and the objects are successive cooled as they leave the heated path.

2. The apparatus according to claim 1, wherein the input duct for said second cooling station is connected to the atmosphere.

3. The apparatus as recited in claim 1, the individual supply ducts for the cooling air of said first cooling station are additionally connected to the atmosphere.

4. The apparatus as recited in claim 1, wherein the draw line for the cooling air is connected with the supply line for the cooling air by providing an intermediary cooling unit.

5. The apparatus as recited in claim 1 comprising at least one balancing chamber for each cooling station, the wall of said chamber facing the cooling zone and including sieve-like apertures.

6. The apparatus as recited in claim 5, comprising at least one collection chamber disposed below the wall of a corresponding balancing chamber, the walls of said collection chamber facing said cooling zone and having sieve-like apertures.

7. The apparatus as recited in claim 5, wherein the sieve-like apertures of at least one balancing chamber are obliquely formed to direct cool air at an acute angle with respect to the transport means.

* * * * *